United States Patent Office 2,848,316
Patented Aug. 19, 1958

2,848,316
PROCESS FOR GASEOUS REDUCTION OF IRON ORE

William L. Davis, Jr., and Jerome Feinman, Chicago, Ill., and Leslie R. Little, Jr., New Brighton, Pa., assignors to United States Steel Corporation, a corporation of New Jersey No Drawing. Application June 7, 1956
Serial No. 589,862

1 Claim. (Cl. 75—26)

This invention relates to an improved method of directly reducing iron ore in fluidized beds.

The present application is a continuation-in-part of our earlier co-pending application Serial No. 520,614, filed July 7, 1955, now abandoned.

The usual procedure for reducing iron ore directly involves contacting it at elevated temperatures with a reducing gas, such as hydrogen or carbon monoxide or mixtures thereof. Such processes can be carried out with ore of relatively coarse particle size in static beds or finer particle size in beds fluidized by ascending gas currents. In static beds fines interfere with permeability and must be agglomerated before reduction; hence fluidized beds generally are preferred, although heretofore, they too have possessed disadvantages. Previously about 14 mesh was considered the maximum size of particles that could be handled in a fluidized bed. Another difficulty is that reduced particles tend to weld together and stick, thereby stopping fluidization and rendering the process inoperative.

An object of our invention is to provide an improved method of directly reducing iron ore in fluidized beds in which the maximum particle size is increased to about 1/4 or 3/8 inch and particle sticking is avoided.

A further object is to provide an improved reduction method which has the foregoing advantages, yet requires no added apparatus and actually eleminates pulverizing equipment.

A further object is to provide a direct reduction method wherein the foregoing advantages are attained by operating in accordance with a combination of critical particle sizes, temperatures, bed depths and gas velocities which we have discovered.

According to our method, minus 1/4 or 3/8 inch preheated iron ore is fed to any suitable reactor in which it can be maintained as one or more fluidized beds having a depth of 3 to 15 feet, preferably about 6 to 12 feet. The ore contains 2 to 50 percent by weight of plus 10 mesh particles. Ascending currents of preheated reducing gas also are introduced to the reactor to fluidize the ore beds. The active constituents of the reducing gas consist of hydrogen and up to about 25 percent by volume of carbon monoxide. The presence of a few particles larger than 10 mesh affords the unexpected advantage of enabling us to use higher gas velocities and yet encounter no greater dust loss than with ordinary gas velocities on exclusively fine material. We use superficial gas flow rates of 1.0 to 3.0 feet per second through our fluidized beds, and at such velocities plus 10 mesh particles fluidize. We maintain our bed temperature in the range 1200 to 1600° F. Preferably our method operates on a continuous basis, although the principles would be similar if operated on a batch basis.

The reducing reactions are endothermic, and the necessary heat preferably is supplied by heating the ore and gas before introducing them to the reactor. The reactor temperature is controlled largely by the temperature to which the ore and gas are preheated. We prefer to operate our method in a two-bed system wherein reduction takes place in two steps, first to FeO and second to metallic iron. The method for thus reducing iron ore by control of conditions to approach equilibrium is described fully and claimed in Reed application Serial No. 568,777, filed March 1, 1956, entitled "Two Step Method of Reducing Iron Ore." Therefore we define the term "reactor" as used in the present application as including a system of primary and secondary reaction chambers as shown in the Reed application, as well as a single reaction chamber. In a two bed system of this type, we can maintain our desired bed temperature range by heating the ore to about 1700° F. and the gas to about 1600° F. Nevertheless it is apparent other temperature combinations could be used to provide the same effect, especially in single bed systems.

In a specific example, we applied our reduction method to three samples of minus 3/8 inch hematite ore in its natural state. The screen analyses of the samples were as follows:

| Screen | Cumulative Percent on Each Screen | | |
|---|---|---|---|
| | 1 | 2 | 3 |
| 0.263 | 6.9 | 2.5 | 2.6 |
| 10 mesh | 20.2 | 15.3 | 15.5 |
| 20 mesh | 31.4 | 25.9 | 26.2 |
| 35 mesh | 44.5 | 38.5 | 41.6 |
| 48 mesh | 55.6 | 50.7 | 51.8 |
| 65 mesh | 64.6 | 60.8 | 61.9 |
| 100 mesh | 70.1 | 67.7 | 68.4 |
| Pan | 100.0 | 100.0 | 100.0 |

In each instance the ore was heated to about 1700° F. and introduced to a reactor to form two 6 foot beds in series, as shown in the Reed application. A reducing gas consisting by volume of 74.7 percent hydrogen, 13.8 percent carbon monoxide, and the remainder inerts and oxidation products was heated to 1600° F. and introduced to the reactor in ascending currents at a superficial velocity of 1.0 to 3.0 feet per second to fluidize the beds. The reactor temperature was maintained at about 1300° F. Under these conditions the ore was reduced in two steps to metallic iron without any particles sticking.

While we have described a preferred way of operating our method, it is apparent modifications may arise. Therefore we do not wish to be limited to the disclosure set forth but only by the scope of the appended claims.

We claim:

A method of reducing iron ore directly comprising preheating minus 3/8 inch ore containing 2 to 50 percent by weight of plus 10 mesh particles to about 1700° F., feeding the preheated ore to a reactor to form a bed about 6 to 12 feet in depth, preheating a reducing gas to about 1600° F., the active constituents of said gas consisting of hydrogen and up to about 25 percent by volume of carbon monoxide, introducing ascending currents of the preheated gas to said reactor at a superficial velocity of 1.0 to 3.0 feet per second to fluidize said bed, maintaining the reactor temperature at about 1200 to 1600° F., yet avoiding sticking of the particles by virtue of the presence of the plus 10 mesh particles and recovering a reduced iron product from the reactor.

References Cited in the file of this patent

UNITED STATES PATENTS

| Re. 19,770 | Brown | Dec. 3, 1935 |
| 2,481,217 | Hemminger | Sept. 6, 1949 |
| 2,711,368 | Lewis | June 21, 1955 |
| 2,742,353 | Ogorzaly | Apr. 17, 1956 |
| 2,752,234 | Shipley | June 26, 1956 |